March 7, 1939.  L. NIGRO  2,149,623
COMPRESSION ENGINE FOR VEHICLES
Filed April 14, 1938  2 Sheets-Sheet 1

INVENTOR
Leo Nigro
BY
ATTORNEY

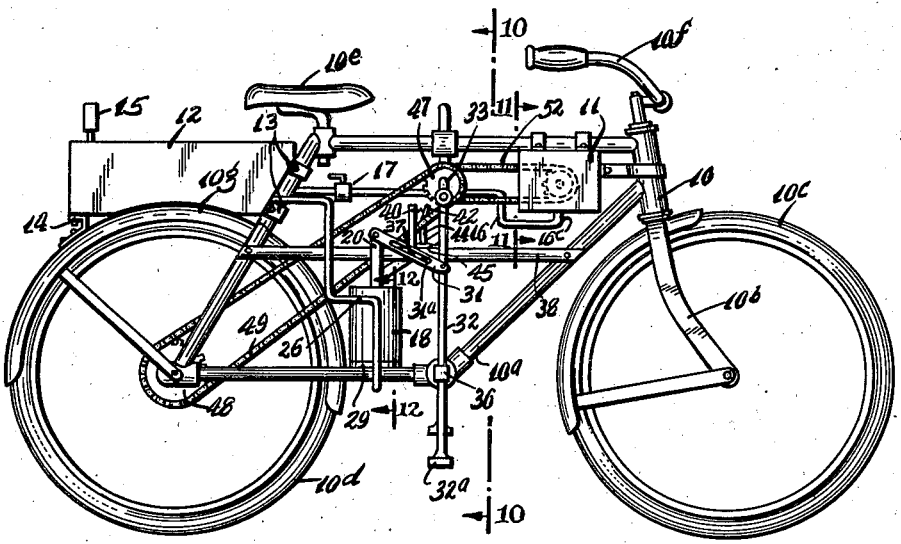

Patented Mar. 7, 1939

2,149,623

UNITED STATES PATENT OFFICE 2,149,623

COMPRESSION ENGINE FOR VEHICLES

Leo Nigro, New York, N. Y.

Application April 14, 1938, Serial No. 201,880

6 Claims. (Cl. 280—216)

This invention relates to new and useful improvements in a compression engine for vehicles, and particularly vehicles of a size capable of being operated manually.

The manual operation referred to is of a particular type in which a foot pedal system may be used for operating the device.

Still further it is proposed to characterize the device itself by a foot pedal system connected to a pump for supplying air to a tank which in turn supplies air to an air engine, of the three cylinder type, which is adapted to assist the foot pedal system in moving the vehicle when going up hill.

A further object of the invention is to provide a means for limiting the operation of the pump for stopping the operation thereof when it is desired to use the foot pedal motion for driving the vehicle itself.

Still further it is proposed to so construct the compression engine that a conventional air turbine may be used in lieu of the three cylinder engine for driving the said vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 9 is an elevational view of still another type of vehicle having a compression engine applied thereto.

Fig. 10 is a sectional view on the line 10—10 of Fig. 9.

Fig. 11 is a sectional view on the line 11—11 of Fig. 9.

Fig. 12 is a sectional view on the line 12—12 of Fig. 9.

Fig. 13 is an enlarged detailed view of a portion of Fig. 12.

Fig. 14 is a sectional view on the line 14—14 of Fig. 13.

Fig. 15 is a sectional view on the line 15—15 of Fig. 12.

Fig. 16 is an enlarged detailed view of a portion of Fig. 9.

Fig. 17 is a sectional plan view of a portion of the tank.

Figure 1:
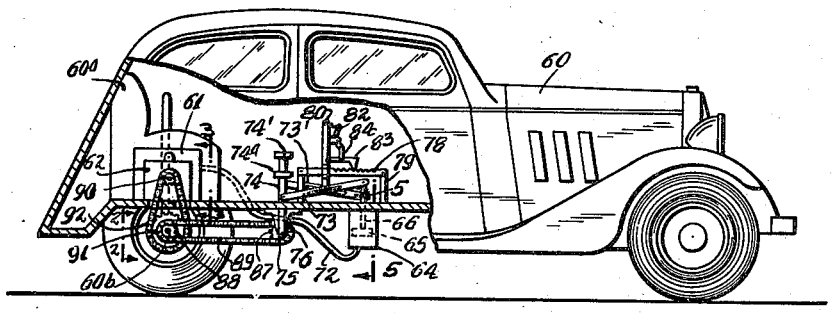
Fig. 1 is an elevational view, partly in section, of an automobile having a compression engine constructed according to this invention.
Figure 2:
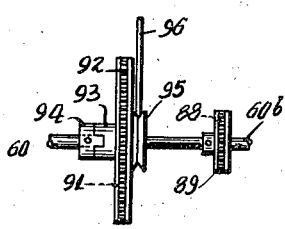
Fig. 2 is a view looking in the direction of the line 2—2 of Fig. 1.
Figure 3:
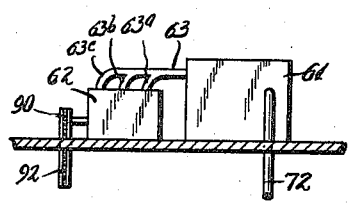
Fig. 3 is a view looking in the direction of the line 3—3 of Fig. 1.
Figure 4:
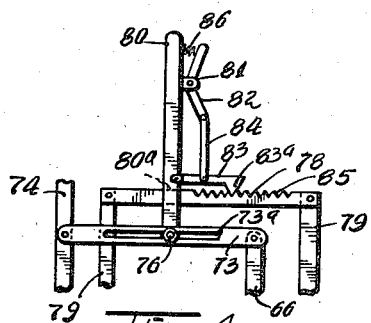
Fig. 4 is an enlarged detailed view of a portion of Fig. 1.
Figure 5:
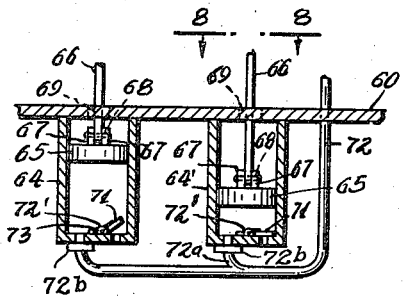
Fig. 5 is a sectional view taken on the line 5—5 of Fig. 1.
Figure 6:
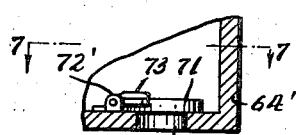
Fig. 6 is an enlarged detailed view of a portion of Fig. 5.
Figure 7:
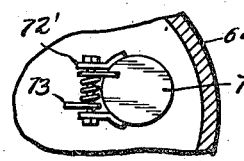
Fig. 7 is a sectional view on the line 7—7 of Fig. 6.
Figure 8:
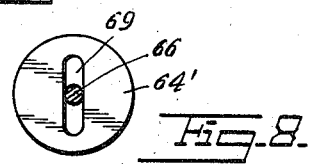
Fig. 8 is a sectional view on the line 8—8 of Fig. 5.

The compression engine for vehicles, according to this invention, is to be used in combination with a conventional automobile 60. The compression engine is positioned adjacent the rear seat 60ᵃ of the vehicle and is adapted to be manipulated from this position. Further specific details of the automobile will not be given in this specification as it is of conventional construction.

A tank 61 is supported upon the floor of the vehicle 60 and is contained within the rear seat. This tank 61 is of air tight construction and is adapted to hold a supply of compressed air for operating the engine of the device for moving the vehicle when desired.

An air engine 62 of the three cylinder type is also supported upon the floor of the vehicle 60 adjacent the tank 61. A pipe line 63 extends between the tank 61 and the engine 62. This pipe 63 in the vicinity of the engine 62 is subdivided into branch pipes 63ᵃ, 63ᵇ and 63ᶜ for supplying air to each of the three cylinders making up the engine 62.

An air pump is provided for supplying compressed air to the tank 61 and is characterized by cylinders 64 and 64'. The cylinder 64 has a piston 65 vertically slidably mounted therein. A rod 66 is pivotally supported upon the top face of the piston 65 and is adapted to control vertical movement of the piston within the cylinder 64. The bottom end of the rod 66 is disposed between a pair of lugs 67 formed on the top face of the piston 65. A pin 68 is engaged through the lugs 67 and the bottom end of the rod 66 and comprises the means for pivotally connecting the rod with the piston.

The rod 66 extends upward through an elongated slot 69 formed in the top of the cylinder 64. At its bottom end the cylinder 64 is formed with an opening 70 which connects with the atmosphere and which is adapted to be closed by a spring pressed valve 71. The valve 71 is pivotally supported upon lugs 72'. A spring 73 is coaxially mounted upon the pivot of the valve 71 and operates between the bottom wall of the cylinder 64 and a portion of the valve 71 for urging the valve into its normally closed position. When the piston 65 moves upwards the valve 71 is adapted to be opened to permit air to pass into the cylinder 64.

A pipe line 72 connects the bottom end of the cylinder 64 with the tank 61 and when the piston 65 moves downwards the air contained therein is forced through the pipe 72 to the tank 61. A valve 72$^b$ is located within the end of the pipe 72 in the vicinity of the cylinder 64 to permit the air to pass through the pipe when the piston 65 moves downward.

The cylinder 64' is constructed in the same manner as the cylinder 64 and similar reference numerals are used to designate corresponding parts. A branch pipe 72$^a$ connects the bottom end of the cylinder 64' with the pipe 72 for conveying the air compressed within the cylinder 64' to the tank 61.

The cylinders 64 and 64' are attached to the bottom face of the floor of the vehicle 60. The rods 66 of the cylinders 64 and 64' extend into the inside of the vehicle 60. The rod 66 of the cylinder 64 is pivotally connected at its top end with a pivotally mounted lever 73. The rod 66 of the cylinder 64' is connected at its top end with a similar pivotally mounted lever 73'. A pedal system is provided on a portion of the vehicle 60 for rocking the lever 73. This pedal system is characterized by a rod 74 which is rotatively supported at its bottom end upon one arm of a crank 75. The crank 75 is rotatively supported in a bearing 76 attached to the bottom face of the floor of the vehicle 60. The rod 74 extends upward and is formed at its upper end with a pedal portion 74$^a$ upon which the foot of the operator may be placed so that when his weight is placed thereon, the rod will move downward and correspondingly move the lever 73 for operating the piston 65 within the cylinder 64.

The lever 73 is pivotally mounted intermediate of its ends upon a fulcrum 76 so that when the rod 74 moves up and down it will rock the lever 73. A similar rod 74' and corresponding mechanism is provided for controlling the movement of the lever 73' so that when it is rocked by the rod 74', it will move the piston 65 up and down within the cylinder 64'. Reference numerals similar to those used relative to the rod 74 are used to designate the corresponding parts of the mechanism connected to the rod 74'.

The lever 73 is formed with a means for shifting the fulcrum point 76 to vary its mechanical advantage. This means comprises a bar 78 which is fixedly attached at its ends to upwardly extending brackets 79 attached to the floor of the vehicle 60. A handle 80 is formed intermediate of its ends with a sleeve 80$^a$ which is adapted to slidably engage the bar 78. At its bottom end the handle 80 is formed with the fulcrum 76. The fulcrum engages through an elongated slot 73$^a$ formed in the lever 73. At its top end the lever 80 is formed with outwardly extending lugs 81 upon which an L-shaped bell-crank 82 is pivotally supported. At a point immediately above the sleeve 80$^a$ the handle 80 has a lug element 83 pivotally supported thereon. A connecting wire 84 extends between a portion of the lug element 83 and the bell-crank 82 so that when the bell-crank 82 is pivoted it will cause the lock element to pivot on the handle 80. The free end of the lock element is formed with a pointed portion 83$^a$ which is adapted to be selectively engaged into one of a plurality of teeth 85 formed along the length of the bar 78.

A spring 86 operates between the top end of the handle 80 and the free arm of the bell-crank 82 for urging the bell-crank into a position in which the lock element will be engaged with the teeth 85. When the lock element 83 is disengaged from the teeth 85 the handle 83 may be moved along the length of the bar 85 for changing the position of the fulcrum 76 with relation to the slot 73.

The rod 74 is pivotally connected at one end of the lever 73 and the rod 66 is pivotally connected at the other end of the lever 73. When the handle 80 is moved along the bar 85 to position the fulcrum 76 at the end of the slot 73$^a$ adjacent the rod 66 the movement of the piston 65 within the cylinder 64 will be very small. Thus the lever may be moved for increasing or decreasing the oscillation of the piston 65.

A similar mechanism is provided in connection with the lever 73' for controlling the operation of the piston 65 within the cylinder 64'. Similar reference numerals are used for indicating the portions which correspond with the mechanism described relative to the lever 73.

A sprocket wheel 87 is mounted on an intermediate portion of the crank 75 and a similar sprocket wheel 88 is fixedly attached to the rear axle 60$^b$ of the vehicle 60. A chain 89 extends between sprockets 87 and 88 for transmitting the rotations of the crank to the rear axle for moving the vehicle when the rods 74 and 74' are oscillated. A sprocket wheel 90 is mounted upon an extended portion of the crank contained within the air engine 62. A second sprocket 91 is also supported upon the rear axle 60$^b$ and a chain 92 extends between the sprockets 90 and 91 for assisting in moving the vehicle when the air engine 62 is operated. Thus when a sufficient pressure has been worked up within the tank 61 it will be transmitted to the cylinders of the air engine 62 through the pipe 63 for operating this air engine. Rotations of the air engine will be transmitted to the rear axle 60$^b$ through the sprockets 90 and 91 and the chain 92.

The sprocket 91 is slidably supported upon the rear axle 60$^b$ and a clutch mechanism is associated therewith for selectively connecting the sprocket with the axle. A clutch member 93 is fixedly attached to one face of the sprocket wheel 91 and is adapted to be inter-engaged with a complementary clutch element 94 fixedly attached to a portion of the rear axle 60$^b$. A grooved wheel 95 is fixedly attached to the other face of the sprocket 91. A handle 96 which extends into the automobile 60 through a portion of the seat 60$^a$ and which is pivotally mounted intermediate of its ends has its bottom end engaging the grooved wheel 95 so that when the handle 96 is shifted it will cause the clutch elements 93 and 94 to be engaged and disengaged for controlling the operation of the rear axle by the engine 62.

The operation of this device is as follows:

The person in the car who is to manipulate the air engine seats himself on the rear seat 60$^a$ and rests his feet upon the pedal portions 74$^a$ formed on the top ends of the rods 74 and 74'. He then moves his feet up and down as though he were walking to cause the rods 74 and 74' to move vertically and rotate the crank 75. The rotation of the crank 75 will be transmitted to the rear axle 60$^b$ through the sprockets 87 and 88 for rotating this rear axle to move the vehicle.

If it is desired to work up a pressure within the tank 71 the handle 80 is moved to its proper position to cause the levers 73 and 73' to oscillate the rod 66 when the rods 74 and 74' are moving vertically. Movements of the lever 66 causes the piston 65 to move up and down within the cylinders 64 and 64'. Movement of the piston 65 causes compressed air to be forced into the tank 61. When a desired pressure has been reached the air will pass through the pipe 63 to the air engine 62 for operating the same. Operation of the air engine 62 will cause the sprocket 90 to be rotated and rotations of this sprocket will be transmitted to the sprocket 91 by the chain 92.

According to the modification shown in Figs. 9 to 17, the engine is to be used in combination with a bicycle 10. The bicycle 10 is substantially of conventional construction having a frame 10$^a$ supporting a fork 10$^b$ having a front wheel 10$^c$. A rear wheel 10$^d$ is mounted upon a rear portion of the frame 10$^a$ and a seat 10$^e$ is also supported thereon. A handle bar 10$^f$ is provided for controlling the operation of the fork 10$^b$ for steering the said bicycle. An air engine 11 of the three cylinder type is mounted upon a portion of the frame for driving the vehicle. Further specific details of this air engine will not be given in this specification since air engines of this type are generally known in the art.

A tank 12 is supported upon a portion of the frame 10$^a$ for supplying air to the air engine 11. Brackets 13 engage around a portion of the frame 10$^a$ and are connected with a portion of the tank 12 for supporting it thereon. The bottom of the tank rests upon a fender 10$^g$ supported upon the back of the frame 10$^a$. A bracket 14 extends between a portion of the fender 10$^g$ and the bottom of the tank 12 for preventing the tank from shifting on the frame 10$^a$. A gauge 15 is provided for indicating the pressure of the air contained within the tank 12.

A pipe line 16 extends between the tank 12 and the engine 11 for conveying the air to the engine 11. Intermediate the ends, the pipe line 16 is provided with a stop cock 17 for controlling the operation of the engine 11. This stop cock 17 is so situated with relation to the seat 10$^e$ that the rider of the bicycle may easily manipulate the same from the seat. In the vicinity of the engine 11 the pipe line 16 divides into branches 16$^a$, 16$^b$ and 16$^c$ for supplying air to each of the three cylinders comprising the air engine 11.

The air pump is provided for supplying air to the tank 12 and is characterized by a cylinder 18 and a cylinder 18'. The cylinder 18 has a piston 19 vertically slidably mounted therein and has a rod 20 pivotally supported upon the top end thereof. The bottom end of the rod 20 engages between oppositely disposed lugs 21 formed on the piston 19. A pin 22 engages through the adjacent portions of the lugs 21 and the rod 20 for forming the pivotal mounting thereof.

The rod 20 extends upward through an elongated slot 23 formed in the top end of the cylinder 18. At its bottom end the cylinder 18 is formed with an opening 24 which is adapted to be closed by a valve 25. This valve 25 comprises a disc 25$^a$ for engaging over the opening 24 and which is provided with lugs 26 pivotally supported upon lugs 27 attached to the bottom of the cylinder. A spring 28 is coaxially mounted upon the pivot of the lugs 26 and 27 and has the ends engaging against the top of the disc 25$^a$ and the bottom wall of the cylinder 18 for urging the disc 25$^a$ to its closed position.

The disc 25$^a$ is adapted to be moved to its open position when the piston 19 moves upwards for sucking air into the cylinder 18. When the piston 19 moves down it forces the air through a valve 26$^b$ located upon the end of a pipe 26 which extends to the tank 12. This valve 26$^b$ is similar to the other valve 25 except that it is arranged to open when the piston 19 moves downwards.

The cylinder 18' is constructed in the same manner as the cylinder 18 and similar reference numerals are used to indicate the same parts. A branch 26$^a$ of the pipe 26 extends to the cylinder 18' for conveying air compressed thereby to the tank 12.

At its end the pipe 26 extends into an opening 27 formed in the tank 12 and a valve 28 extends across the end of the pipe 26 for preventing the air from passing from the tank therethrough. This valve 28 is adapted to be opened for permitting the air compressed by the pump to pass into the tank 12.

The cylinders 18 and 18' are attached to a plate 29 supported upon a portion of the frame 10$^a$ by means of a bracket 30. A pivotally mounted lever 31 is connected at one end with the upwardly extending rod 20 of the cylinder 18 for controlling the operation of the piston 19. A similar lever 31' is pivotally supported for controlling the operation of the piston 19 located within the cylinder 18'. A pedal system is supported upon a portion of the frame 10$^a$ for rocking the lever 31. This pedal system is characterized by a rod 32 rotatively supported at its top end upon one arm of a crank 33 rotatively attached to a bracket 35. The bracket 35 is supported upon a portion of the frame 10$^a$. This rod 32 extends downwards and slidably engages a sleeve 36 pivotally supported upon the frame 10$^a$. The bottom end of the rod 32 is formed with a pedal 32$^a$ upon which the foot of the rider may be placed so that when his weight is supported thereon the rod will be moved downwards. The lever 31 is connected with the rod 32 at a point between the sleeve 36 and the crank 33.

The lever 31 is pivotally supported intermediate its ends upon a fulcrum 37 so that when the rod 32 moves up and down it will rock the lever 31 to cause the piston 19 to move up and down within the cylinder 18. A similar rod 32' and corresponding mechanism is provided for controlling the movement of the piston 19 within the cylinder 18'. Reference numerals similar to those used in connection with the rod 32 are used for designating the corresponding parts of the mechanism connected with the rod 32'.

The lever 31 is formed with a means for shifting its fulcrum point 37 to vary its mechanical advantage. This means comprises a bar 38 which is mounted between portions of the frame 10$^a$ and which has a sleeve 39 slidably supported thereon. This sleeve 39 carries the fulcrum 37 and has a handle 40 fixedly attached thereto and which extends upwards thereof. Lugs 41 are formed upon the handle 40 and a bell-crank 42 is pivotally supported upon the lugs 41. A spring 43 operates between a portion of the handle 40 and the bell-crank 42 for urging this portion away from the handle 40.

A connecting wire 44 is connected at one of its ends to the other arm of the bell-crank 42 and has its other end connected intermediate the ends of a catch element 45 pivotally supported at one of its ends upon the sleeve 39. The other end of the catch element 45 is formed with a pointed portion 45ª which is adapted to be selectively engaged into a plurality of teeth 46 formed in the shaft 38 for holding the sleeve 37 in various adjusted positions along the shaft 38 for changing the position of the fulcrum 37 with relation to the bar 31.

The bar 31 is formed with an elongated slot 31ª in which the fulcrum 37 works to permit the fulcrum to be shifted to various positions along the length of the lever 31. When the fulcrum is to the extreme left of the slot (see Fig. 16) the rod 20 will move through a very little distance and cut down the motion of the piston 19 within the cylinder 20. When pedaling along and it is not desired to have the portion of the pump characterized by the cylinder 18 operate, the handle 40 may be moved backwards to decrease the oscillation of the rod 20.

A similar mechanism is provided in connection with the lever 31' for controlling the operation of the piston within the cylinder 18' and corresponding reference numerals are utilized for indicating the portions which correspond with the mechanism described in connection with the lever 31.

A sprocket 47 is mounted upon a portion of the crank 33 and a similar sprocket 48 is mounted upon the spindle of the rear wheel 10ᵈ. A sprocket chain 49 extends between the sprocket 47 and the sprocket 48 so that the movement of the rods 32 and 32' may be utilized for directly driving the rear wheel 10ᵈ.

The air engine has its three cylinders separated by means of a cutaway portion 11ª formed in the casing of the air engine and a sprocket 50 is mounted within the cutout 11ª. A similar sprocket 51 is mounted upon a portion of the crank 33 and a chain 52 extends between the sprockets 50 and 51 for conveying the rotations created by the engine 11 to the sprocket 50 so that this sprocket may help to rotate the crank 33 and so help to rotate the rear wheel 10ᵈ to help the rider of the vehicle to move up hills.

Instead of an engine, a suitable turbine may be used.

A clutch is provided for controlling the operation of the engine 11 and comprises a grooved wheel 52 fixedly attached to one face of the sprocket 51. A clutch member 53 engages around a portion of the crank 33 and has the sprocket 51 attached thereto. This clutch member 53 is slidably supported upon the crank 33 and is adapted to cooperate with a similar clutch member 54 fixedly attached to the bracket 35 which rotatively supports the crank 33 so that when the two are inter-engaged the rotations from the sprocket 51 will be transmitted to the crank 33. A means is provided for disengaging the clutch members 53 and 54 and comprises a lever 55 pivotally supported intermediate its ends upon a lug 56 attached to a portion 10ª of the bicycle. The lever 55 engages the grooved wheel 52 so that when the handle 55 is pivoted it will slide the sprocket 51 to disengage the clutch members 53 and 54.

The operation of this device is as follows:

The rider sits upon the seat 10ᵉ and rests his feet on the pedals 32ª formed on the bottom ends of the rods 32 and 32'. He then moves his feet up and down as though he were walking to cause the rods 32 and 32' to move vertically of the frame 10ª to turn the crank 32, which rotations will be transmitted to the rear wheel 10ᵈ by means of the sprockets 47, 48 and the sprocket chain 49.

If he desires to work up a pressure within the tank 12 he moves the handles 40 to their proper position to cause the levers 31 and 31' to rock to oscillate the rods 20 to move the pistons 19 up and down within the cylinders 18 and 18'. This movement of the pistons 19 causes the air pump to supply air to the tank 12 which will be stored therein.

When a desired pressure is reached within the tank 12, which is determined by the gauge 15, the stop cock 17 may be opened to permit the air to pass through the line 16 to the air engine 11. This will cause the cylinders within the air engine to oscillate to rotate the sprocket 50, and which rotations will be transmitted to the crank 33 by the sprocket chain 52. The rotation of the crank 32 by the air engine 11 will assist the operator in moving up hills.

It is to be understood that the tank 61 may be large enough to keep a whole vehicle floating in water. This safety feature may be utilized during flood or if the vehicle is driven into water.

A pump such as 18 and 64 may be suitably connected to the wheel of the vehicle so that when the latter moves down hill or on a down grade, the pump should automatically fill the corresponding air tank and thus store up energy.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a vehicle, an air engine for driving said vehicle, a tank for supplying compressed air to said engine, an air pump for supplying air to said tank, a pivotally mounted lever connected at one end with said pump to operate the same when rocked, a pedal system for rocking said lever, and means for shifting the pivot of said lever to vary its mechanical advantage.

2. In combination with a vehicle, an air engine for driving said vehicle, a tank for supplying compressed air to said engine, an air pump for supplying air to said tank, a pivotally mounted lever connected at one end with said pump to operate the same when rocked, a pedal system for rocking said lever, and means for shifting the pivot of said lever to vary its mechanical advantage, an air line extending between said pump and said tank for conveying the air from said pump to said tank, and an air line extending between said tank and said air engine for conveying the air from said tank to said engine to operate the same.

3. In combination with a vehicle, an air engine for driving said vehicle, a tank for supplying compressed air to said engine, an air pump for supplying air to said tank, a pivotally mounted lever connected at one end with said pump to operate the same when rocked, a pedal system for rocking said lever, and means for shifting the pivot of said lever to vary its mechanical advantage, said pedal system being characterized by rods vertically slidably supported upon a portion of said vehicle and which are adapted to be moved vertically by the operator of said vehicle.

4. In combination with a vehicle, an air engine for driving said vehicle, a tank for supplying compressed air to said engine, an air pump for supplying air to said tank, a pivotally mounted lever connected at one end with said pump to operate the same when rocked, a pedal system for rocking said lever, and means for shifting the pivot of said lever to vary its mechanical advantage, said vehicle comprising a bicycle of substantially conventional construction having a frame, a back section, a pivotally mounted fork, a handle bar associated therewith, a wheel on said rear section and a wheel on said fork.

5. In combination with a vehicle, an air engine for driving said vehicle, a tank for supplying compressed air to said engine, an air pump for supplying air to said tank, a pivotally mounted lever connected at one end with said pump to operate the same when rocked, a pedal system for rocking said lever, and means for shifting the pivot of said lever to vary its mechanical advantage, said vehicle comprising a bicycle of substantially conventional construction having a frame, a back section, a pivotally mounted fork, a handle bar associated therewith, a wheel on said rear section and a wheel on said fork, and means for directly driving said rear wheel comprising a sprocket wheel associated with said pedal system, a sprocket wheel fixedly attached to the spindle of said rear wheel, and a sprocket chain extending between said sprocket wheels for transmitting the rotations of said former sprocket wheel to said latter sprocket wheel to move said bicycle when said pedal system is operated.

6. In combination with a vehicle, an air engine for driving said vehicle, a tank for supplying compressed air to said engine, an air pump for supplying air to said tank, a pivotally mounted lever connected at one end with said pump to operate the same when rocked, a pedal system for rocking said lever, and means for shifting the pivot of said lever to vary its mechanical advantage, said means for shifting the pivot of said lever comprising a bar mounted on said vehicle, a sleeve slidably supported on said bar and carrying the pivot support for said lever, said pivot support working within a slot in said lever, and means for holding said sleeve in various adjusted positions along said bar.

LEO NIGRO.